C. H. THIE & W. M. BUTTLER.
INTERNAL COMBUSTION MOTOR.
APPLICATION FILED MAY 8, 1916.
1,282,983.
Patented Oct. 29, 1918.
5 SHEETS—SHEET 5.
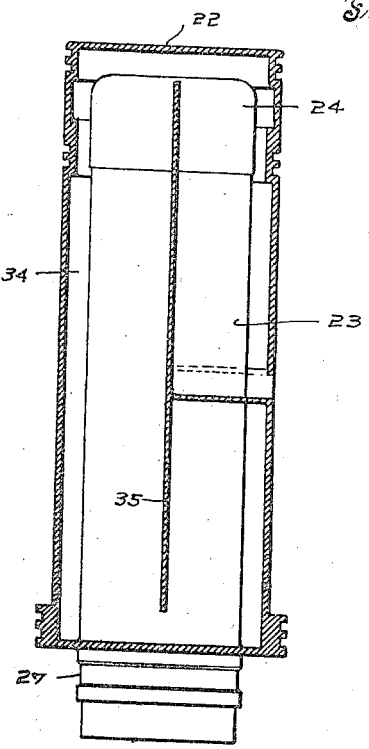
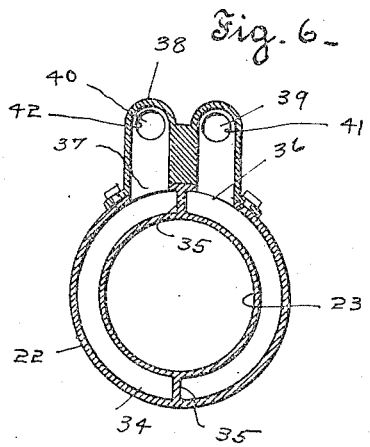
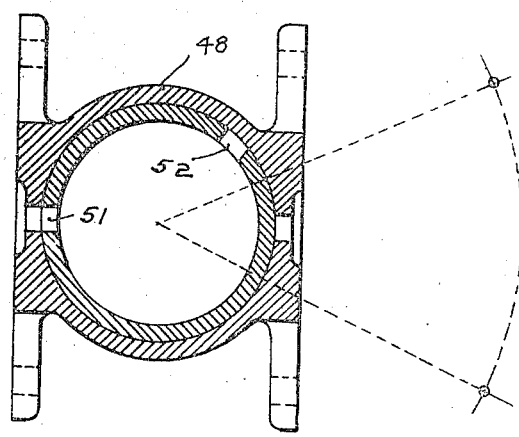

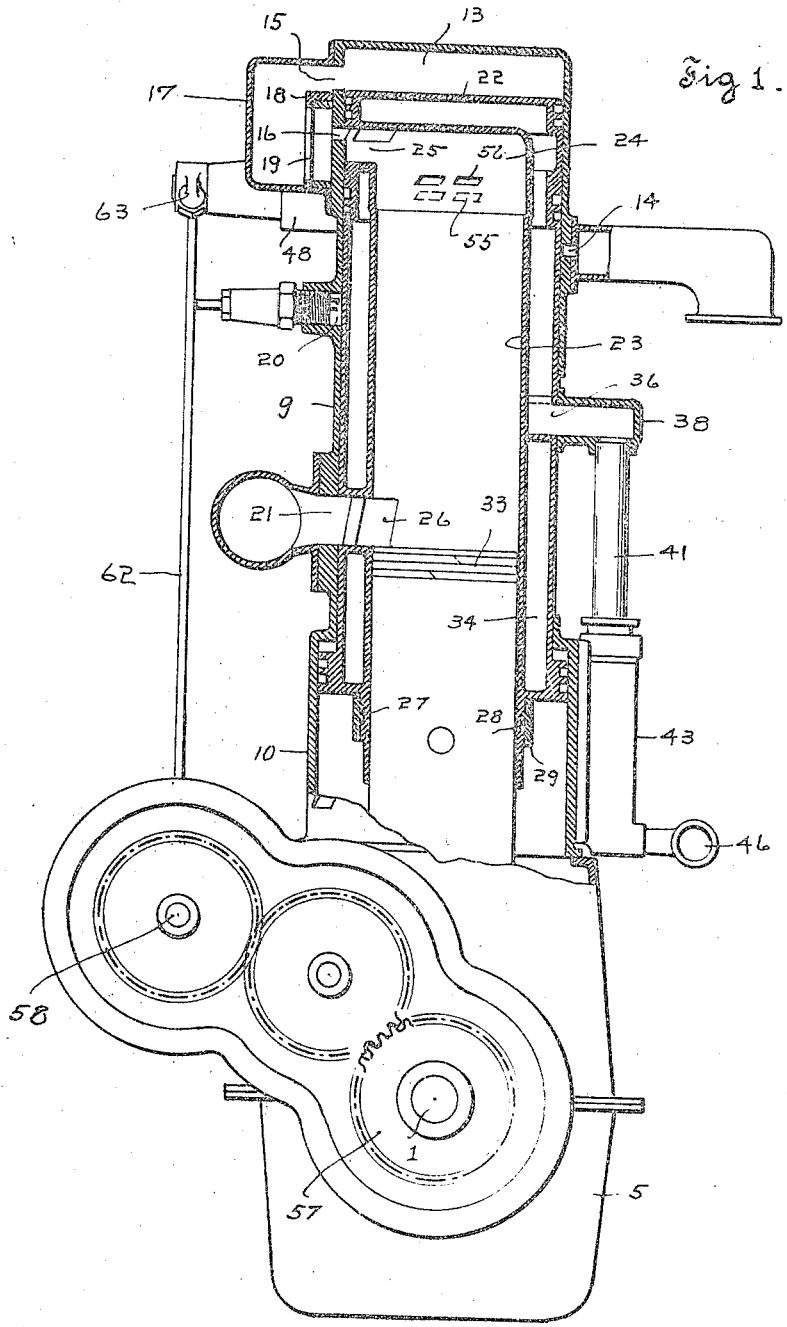

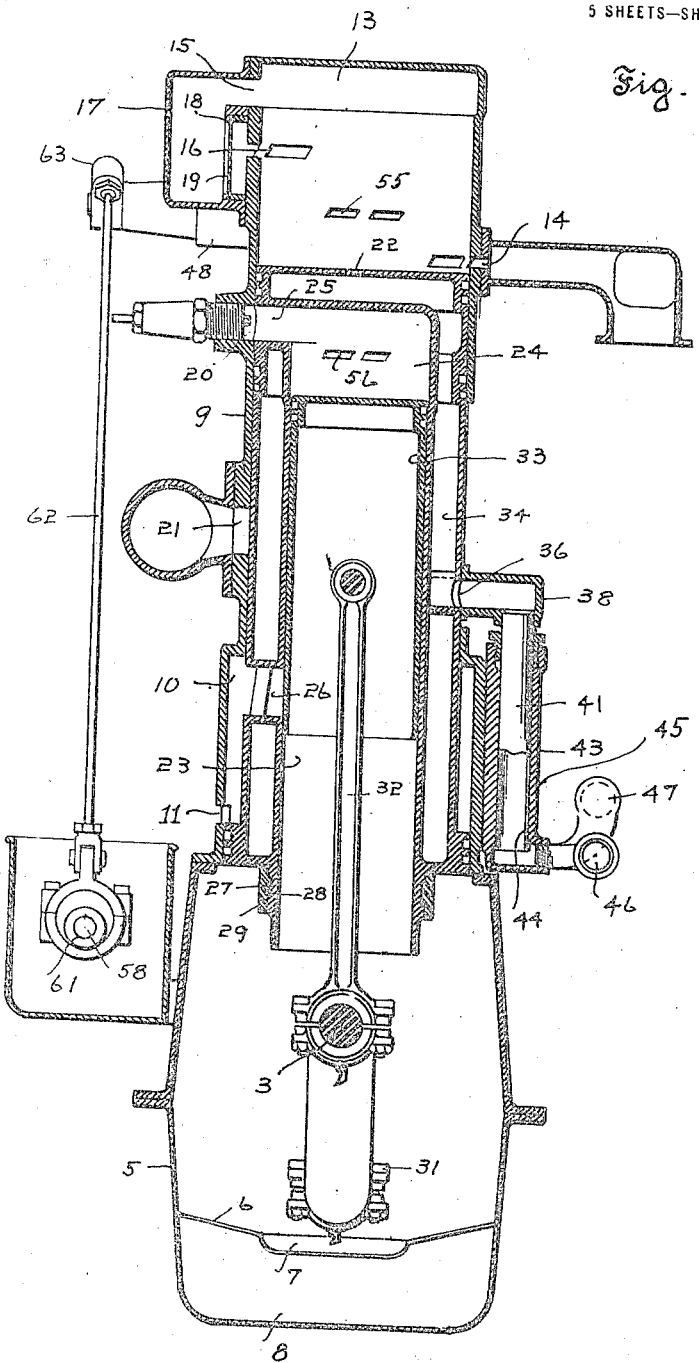

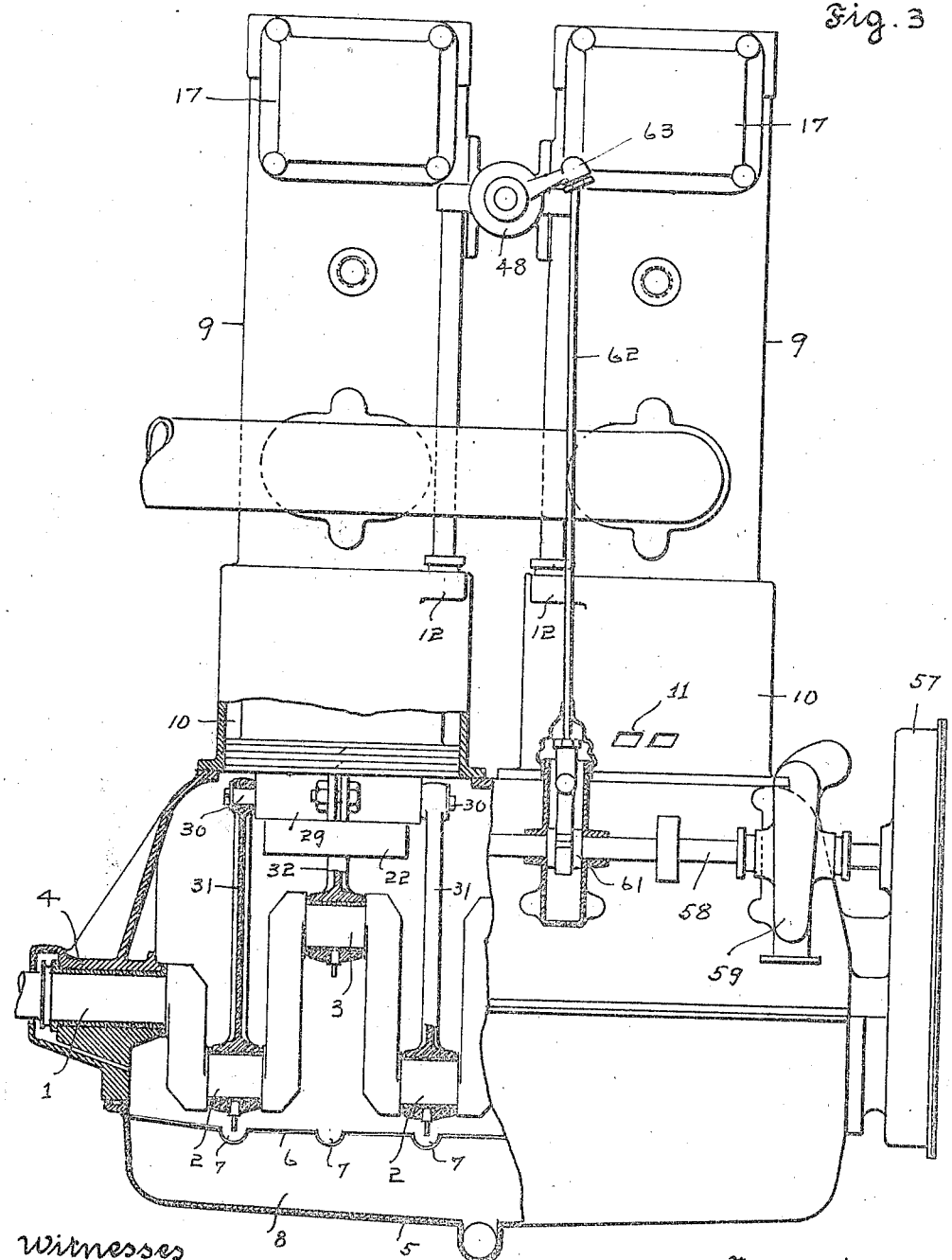

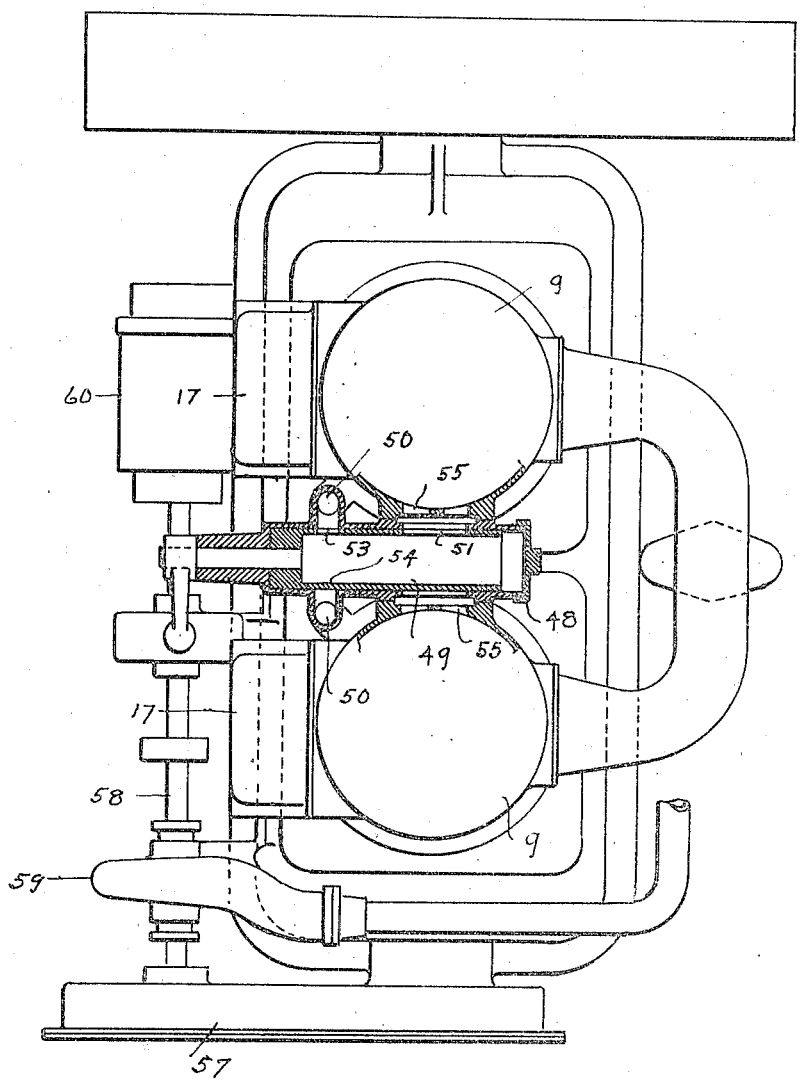

UNITED STATES PATENT OFFICE.

CHARLES H. THIE AND WILLARD M. BUTTLER, OF TOLEDO, OHIO.

INTERNAL-COMBUSTION MOTOR.

1,282,983.  Specification of Letters Patent.  Patented Oct. 29, 1918.

Application filed May 8, 1916. Serial No. 96,008.

*To all whom it may concern:*

Be it known that I, CHARLES H. THIE, a citizen of the United States, residing at Toledo, in the county of Lucas and State of Ohio, and I, WILLARD M. BUTTLER, a citizen of the United States, residing at Toledo, in the county of Lucas and State of Ohio, have invented a new and useful Improvement in an Internal-Combustion Motor, of which the following is a specification.

Our invention relates to a two-cycle internal combustion motor and has for its object to provide a motor of the kind with opposed cranks, rods coupled to pistons telescopically movable in a common cylinder, being adapted to conjointly effect a power stroke simultaneous with the compression of a new charge and the compression of a volume of flushing air, said flushing air being controlled in part by a valve permitting its inlet into the combustion chamber after the exhaust ports are partially opened and before the transfer ports are in register for the admission of the new compressed charge; and in the return stroke of the pistons to compress the new charge in the combustion chamber and respectively indraw a charge for pre-compression and a volume of air for flushing. The invention further comprises new and novel features embodied in the construction of the motor.

The objects of our invention are accomplished as hereinafter described and illustrated in the drawings in which, Figure 1, is a cross section of the motor showing the pistons in the firing position.

Fig. 2, is a partial section showing the pistons at the end of their respective strokes and showing gear transmission for the auxiliary shaft drive for the water pump, the mechanism actuating the flushing air valve and the ignition.

Fig. 3, is a side elevation of the motor, part of the crank case being in section to show the opposed cranks.

Fig. 4, is a top plan view of the motor showing the air valve and a part of the cylinders in section.

Fig. 5, is a partial section of the outer piston showing the diaphragm for directing the course of the cooling water.

Fig. 6, is also a section of the outer piston in the horizontal plane showing the water inlet and the water outlet coupled thereto, and Fig. 7, is a vertical cross section of the air valve showing the relative position of the ports in the valve to the ports in the valve body.

The drawings show a two-cylinder motor constructed in accordance with our invention. The crank shaft 1 of the motor has opposed cranks 2 and 3 respectively for each one of the cylinders and is journaled in a rear bearing 4 and a front bearing not shown. The crank shaft is inclosed by the bottom half 5 of the crank case, which is provided with a diaphragm 6 having oil wells 7 located in line with the stroke of the respective cranks; said diaphragm being also adapted to form the top of an oil reservoir 8 in the bottom of the lower half of the crank case.

Each cylinder 9 is provided with a differential bore for a compressing chamber 10 for scavenging air, being each provided with an inlet port 11 and an outlet port 12. The top of each cylinder serves as a compressor chamber 13 having each an inlet port 14 for carbureted air and by-pass ports 15 and 16.

These ports communicate with receivers 17 each having a sub-chamber wall 18 around the respective port 16, the face opening of each of said chamber walls being provided with a foraminous fabric 19 to prevent back fire from the combustion chamber.

Each cylinder is further provided with an ignition port 20 and exhaust ports 21.

The pistons 22 conform to the differentiation of the respective bores of the cylinders and each being annular provides a cylinder 23 and a combustion chamber 24. Each piston 22 is provided with a port 25 so disposed that when the piston is in the position shown in Fig. 2, said port is in line with the ignition port 20. Each piston 22 is further provided with an exhaust port 26 adapted to register with the exhaust port 21 in the respective cylinder 9, when the piston 22 is in the position shown in Fig. 1. The relative spacing of the ignition port 25 from the exhaust port is such as to register the ignition port with the port 16 when the respective exhaust ports are in register at the end of the up-stroke of the piston 22.

The base of each of said pistons is provided with a recess 27 adapted to receive the tongue 28 of a clamp ring 29. Each ring is provided with diametrically opposite trunnions 30 on which are fulcrumed the respective connecting rods 31. These rods are pivoted upon the cranks 2 and are coupled to the respective trunnions. Upon the crank 3 is pivoted a rod 32 connecting thereto the piston 33 movable in the cylinder 23. The piston 22 being annular provides a surrounding water chamber 34. Each water chamber is provided with diaphragms 35 which are arranged in part vertically and in part laterally to deflect cooling water from the inlet port 36 to the top of the water chamber and from there to direct the cooling water toward the bottom of the piston and then up to the outlet port 37. A header 38 is coupled to each piston 22, having an inlet chamber 39 and an outlet chamber 40. A tube 41 and a tube 42 respectively depend from said chambers, each tube being telescopically movable in a fixed header 43, having bores 44 and 45 to receive the respective tubes 41 and 42. The bores 44 and 45 of the header are respectively coupled to the intake water pipe 46 and to the outlet water pipe 47.

Each cylinder 9 is slotted to permit movement of the header 38.

48 designates a valve body coupled to the cylinders 9 being provided with a rock valve 49 and having opposite ports 50 each of which is tube-coupled to the respective outlet port 12 of the respective compressor 10.

The rock-valve is provided with outlet ports 51 and 52 and inlet ports 53 and 54 whereby when the valve is rocked, compressed air is directed into alternate cylinders for flushing.

The compressed flushing air is permitted to enter each respective cylinder after the exhaust port of one of the cylinders is partially opened and before the ignition port commences to register with the respective transfer port 16, each cylinder 9 and each piston 22 being provided with ports 55 and 56 respectively for inlet of flushing air.

57 designates a drive for the auxiliary shaft 58 adapted to impel the water circulating pump 59 and the ignition magneto 60 or a distributer. The shaft is also provided with an eccentric 61 adapted to impart motion to the rock valve by means of a rod 62 which latter is articularly coupled to the eccentric and to the valve arm 63.

The operation of our motor is as follows: The respective pistons, in the position shown in Fig. 1, are impelled in opposite directions by the ignition of the charge in the combustion chamber effecting a balanced impulse of motion upon the crank shaft, and as the end of the power stroke approaches, the exhaust ports are first registered, following by the valve controlled admission of scavenging air before the transfer port 16 registers with the ignition port at the end of the stroke to permit the pre-compressed new charge to enter the combustion chamber. The scavenging air is thereby interposed between the exhaust and the new charge, insuring thereby not only its purity but prevents loss through the exhaust ports. On the return stroke the new charge is compressed and the scavenging compressor and the pre-compressor of new charges are filled through their respective ports.

What we claim is—

1. A two cycle internal combustion motor comprising opposed cranks, a fixed main cylinder having a differential bore, its top being adapted for a pre-compressor of new charges and its larger bore as a compressor for flushing air, a piston movable in said cylinder, its step diameters conforming to the differential bores of the fixed cylinder, being annular, and having an interior cylinder adapted for a combustion chamber, a piston movable in said interior cylinder, ports in the walls of the step piston and its receiving cylinder, adapted to register for ignition, for exhausting, and for recharging the interior cylinder, flushing ports in the fixed cylinder and in the step piston adapted to register in the travel of the step piston, opening in the up-travel of said piston after the exhaust ports are in part registered and to close before the intake ports are in register, a rock valve for the flushing air, having ports adapted to open when the flushing ports of the cylinder and the step piston are in register in the upstroke of the step piston and to be closed when the ports of the cylinder and the step piston are re-registered in the down stroke of the step piston, connection between the compressor of the flushing charge and the inlet port of the rock valve, an auxiliary shaft having means for actuating the rock valve, connecting rods for coupling the step piston and the inside piston to the respective cranks and means for cooling the walls of the step piston.

2. A two cycle motor, comprising a fixed cylinder having a step bore and a step piston movable therein, forming conjointly a top pre-compressor for a new charge and a bottom compressor for flushing air, being each provided with ports registerable for ignition and transfer of a new charge, ports for exhausting, ports for flushing and a valve controlled passage for flushing air, said step piston being formed with an interior cylinder surrounded by a water chamber extending from the step over the top of the interior cylinder, diaphragms arranged to divide the water chamber and direct cooling water upward at one side of the diaphragm and downward the other side thereof, a header coupled to the step piston, having ports for the inlet and the outlet of cooling water, registering with ports in the piston at opposite sides of the diaphragm and having offset depending sleeves, a fixed body having bores to receive said sleeves, and having port connections for the inlet and the outlet of the cooling water, an auxiliary driven pump for propelling the cooling water, a piston movable in the interior cylinder, an opposed crank, and rod couplings to inside piston and to step piston.

3. A two cycle motor, comprising opposed cranks, a fixed cylinder having a step bore, a step piston movable therein, having an interior cylinder surrounded by a water jacket extending upward from the step and receiving and discharging cooling water on the same side of the jacket, the latter being provided by a diaphragm separating the inlet from the outlet water, a skirt depending from the step piston, its bore being of the diameter of the interior cylinder, a recess formed in the outer face of the skirt extension, a clamp ring meshing in said recess, said clamp ring being provided with opposite trunnions, a connecting rod journaled to each of said trunnions and to cranks respectively arranged one to each side of the central opposed crank, a piston movable in the interior cylinder and a piston rod for coupling the piston to the central opposed crank.

4. A two cycle motor, comprising opposed cranks, a fixed cylinder having a step bore, a step piston movable in the cylinder, forming a top pre-compressor and a bottom scavenging air compressor, a cylinder formed in the interior of the step piston, a piston movable in said interior cylinder, rods for coupling the step piston to the outside cranks and a rod coupling the inner piston to the central opposed crank, an ignition port formed through wall of the step piston being adapted for transfer port at the end of the upstroke of the step piston, exhaust ports through the wall of the step piston registerable with exhaust ports in the fixed cylinder wall, flushing ports in the step piston and in the fixed cylinder, being registerable after the exhaust ports are in part opened and pressure is reduced, a valve body coupled to the cylinder, being ported to the cylinder flushing air ports and ported to the scavenging air compressor a valve in the valve body, having ports arranged to admit air to inlet flushing ports when said ports are in register during the upstroke of the step piston and to close the said inlet ports when the step piston travels downward, an auxiliary shaft having means to actuate said valve.

In witness whereof, we have hereunto set our hands and affixed our seals this 12 day of Feb. 1916.

CHARLES H. THIE. [L. S.]
    WILLARD M. BUTTLER. [L. S.]
Witnesses:
    HERMAN H. MARTIN,
    N. S. BRACKNEY.